(12) United States Patent
Carrasco Vergara (10) Patent No.: US 11,618,531 B2
(45) Date of Patent: Apr. 4, 2023

(54) BICYCLE REAR SPROCKET ASSEMBLY

(71) Applicant: Rotor Componentes Tecnologicos, S.L., Ajalvir-Madrid (ES)

(72) Inventor: Pablo Carrasco Vergara, Ajalvir-Madrid (ES)

(73) Assignee: Rotor Componentes Tecnologicos, S.L., Madrid (ES)

( * ) Notice: Subject to any disclaimer, the term of this patent is extended or adjusted under 35 U.S.C. 154(b) by 1081 days.

(21) Appl. No.: 16/326,485

(22) PCT Filed: Jul. 21, 2017

(86) PCT No.: PCT/EP2017/025220
§ 371 (c)(1),
(2) Date: Feb. 19, 2019

(87) PCT Pub. No.: WO2018/041409
PCT Pub. Date: Mar. 8, 2018

(65) Prior Publication Data
US 2021/0284281 A1 Sep. 16, 2021

(30) Foreign Application Priority Data

Aug. 30, 2016 (ES) ................................ ES201631134

(51) Int. Cl.
*B62M 9/10* (2006.01)
(52) U.S. Cl.
CPC ..................................... *B62M 9/10* (2013.01)

(58) Field of Classification Search
CPC ............. B62M 9/04; B62M 9/06; B62M 9/10
See application file for complete search history.

(56) References Cited

U.S. PATENT DOCUMENTS

2006/0063624 A1\* 3/2006 Voss ........................ B62M 9/105
474/78
2009/0243250 A1\* 10/2009 Chiang .................... B62M 9/10
280/260

(Continued)

FOREIGN PATENT DOCUMENTS

CN 105 015 695 A 11/2015
DE 20 2010 000029 U1 3/2010

(Continued)

*Primary Examiner* — Michael R Mansen
*Assistant Examiner* — Juan J Campos, Jr.
(74) *Attorney, Agent, or Firm* — Bay State IP, LLC (57) ABSTRACT

A sprocket assembly (1) to be mounted on a driver body (4) of a bicycle wheel with a truncated cone shell (2) having a first opening (21) in its small base and a second opening (22) in its large base, both openings being coaxial with the central axis (10) of said shell; a plurality of toothed sprockets (20) having different numbers of teeth for engagement with a chain; an axial fixing member (23), a radial load transmission profile (24) and a toothed torque transmission profile (25); wherein the truncated cone shell (2), the toothed sprockets (20), the axial fixing member (23), the radial load transmission profile (24) and the toothed torque transmission profile (25) are configured in a single piece; being the axial fixing member (23), the radial load transmission profile (24) and the toothed torque transmission profile (25) all disposed towards the inside of the truncated cone shell (2).

8 Claims, 9 Drawing Sheets

(56) References Cited

U.S. PATENT DOCUMENTS

| | | | | |
|---|---|---|---|---|
| 2010/0009794 A1* | 1/2010 | Chiang | ................ | B62M 9/10 |
| | | | | 474/160 |
| 2012/0208662 A1* | 8/2012 | Braedt | ................ | B62M 9/10 |
| | | | | 474/160 |
| 2012/0302384 A1* | 11/2012 | Braedt | ................ | B62M 9/10 |
| | | | | 474/160 |
| 2012/0309572 A1* | 12/2012 | Braedt | ................ | B62M 9/10 |
| | | | | 474/160 |
| 2016/0347410 A1* | 12/2016 | Watarai | ................ | B62M 9/10 |
| 2018/0257742 A1* | 9/2018 | Chen | ................ | F16H 55/30 |

FOREIGN PATENT DOCUMENTS

| | | |
|---|---|---|
| DE | 10 2012 006771 A1 | 10/2013 |
| EP | 2 463 188 A1 | 6/2012 |
| EP | 2 530 007 A1 | 12/2012 |
| EP | 2 826 701 A1 | 1/2015 |
| GB | 1 102 893 A | 2/1968 |

\* cited by examiner

BICYCLE REAR SPROCKET ASSEMBLY

CROSS REFERENCE TO RELATED APPLICATION

This application is for entry into the U.S. National Phase under § 371 for International Application No. PCT/EP2017/025220 having an international filing date of Jul. 21, 2017, and from which priority is claimed under all applicable sections of Title 35 of the United States Code including, but not limited to, Sections 120, 363, and 365(c) and which in turn claims priority under 35 USC 119 to Spanish Patent Application No. P201631134 filed on Aug. 30, 2016.

The present invention relates to a bicycle rear sprocket assembly; and more particularly to a multi-speed sprocket assembly with a plurality of gear wheels comprising: a truncated cone shell, a plurality of toothed sprockets disposed thereon, and members for torque transmission and axial and radial coupling, wherein the truncated cone shell, the sprockets and the load transmission members are configured in one piece in order to maximize the lightness of the assembly.

PRIOR ART

Different configurations of rear sprocket assemblies are known in the sector: some of them having independent sprockets mounted directly on the driver body of the wheel hub; some with sprockets attached to an intermediate or support member which transmits the load from the teeth to the wheel hub; others with the sprockets and the support member forming a single piece, etc.

A sprocket assembly known in the prior art, is provided with a plurality of sprockets of variable diameter radially arranged around a wheel hub. Each toothed wheel, commonly called a sprocket, has a plurality of teeth spaced around its periphery to engage a bicycle chain. The sprockets are mounted on to the wheel hub to transmit the pedaling forces from the bicycle chain to the wheel, usually through an intermediate freewheel mechanism, known as driver body of the wheel hub.

In conventional designs of independent sprockets, each pinion may include a torque transmission profile and a radial load transmission profile which engages a corresponding profile in the driver body of the wheel hub. A disadvantage of this design is that the sprockets are individually acting in the transmission of the pedaling load from the chain to the wheel hub, so the necessary structure to transmit the whole torque from the chain to the wheel hub is multiplied by the number of sprockets of the assembly, which adds a considerable overweight, undesirable in the bicycle sector.

In other devices, the individual sprockets may be joined together by an intermediate support member with arms that receive the load of the sprockets and transmit it to the wheel hub, thereby achieving some weight reduction with respect to an assembly with independent sprockets. When using an intermediate support member for the transmission of loads from the sprockets to the wheel hub, the weight of the assembly is penalized again.

In the above described sprockets assemblies with support member, the sprockets can be attached to the support arms using bolts, threads or similar. These mechanical connections require additional material in the coupling parts, so the assembly becomes heavier.

The documents Shimano EP0834450A1, Arregui U.S. Pat. No. 4,121,474A and Bes Francis U.S. Pat. No. 4,353,447A disclose assemblies having different sized sprockets which are arranged in multi-part supporting members, the arrangements of which lead to complex and heavy assemblies.

The document Schlanger U.S. Pat. No. 6,428,437B1 shows an assembly having different components, wherein the independent sprockets are assembled in a housing. This solution also leads to a complex and relatively heavy structure.

Background close to the present invention are the Sram EP1972539B1 and Sram U.S. Pat. No. 8,911,314B2 documents showing variations of a sprocket assembly comprising a truncated cone shaped shell with a plurality of toothed sprockets integrally arranged with said shell, and a cover member in the large base of the cone, so that the load transmission to the wheel hub is made directly from both elements, shell and cover member, by continuous load transmission profiles: one in the shell itself and another in the cover member.

In the case of the document Sram EP1972539B1 there is shown a sprocket assembly including a truncated conical shell and a cover member which is mounted on a driver body wheel hub. The cover member includes a continuous profile which is both for transmitting torque and radial support at its outer periphery, which mates with a similar profile arranged at the periphery of the large base of the truncated cone shell, located radially inwardly from the coupling teeth with the chain.

In the document SRAM U.S. Pat. No. 8,911,314B2 the cover element has teeth in its periphery, forming sprockets to engage the chain.

However, these torque transmission profiles provided in the cover member and in the conical shell add complexity in manufacturing and weight to the whole set, being the weight reduction in the bicycle the main technical problem to solve in this sector. In addition, the sprocket assemblies are secured to the driver body with a locking nut or screw, which needs the user applies a large tightening torque, whereby the structure of the truncated cone shell would collapse due to the axial force that said screw passes through the entire structure of the shell, until it reaches the cover at the other end of the driver body. Because of this, in practice the sprocket assemblies with this construction always make use of a tubular spacer member disposed between the small base of the cone and the cover member, to withstand all of the aforementioned compression coming from the locking screw, adding again weight to the set.

In the truncated cone shaped sprocket assembly of the invention, all the aforementioned advantages of the truncated cone shell structure are maintained, while the weight of the assembly is reduced by about 10%. This is achieved by eliminating, on the one hand, the structure transmitting torque from the profile of the shell to the engagement profile in the driver body, and on the other hand eliminating the tubular spacer member necessary for the structural reinforcement of its axial anchorage, so that torque transmission is performed exclusively and directly from the small base of the truncated cone shell to the driver body of the wheel hub.

SUMMARY

In the present invention, a sprocket assembly is proposed to be mounted on a driver body of a bicycle wheel hub. This sprocket assembly comprising: a truncated cone shell having a first opening in its small base and a second opening in its large base, being both of them coaxial openings; a plurality of toothed sprockets which are arranged in the truncated cone shell extending radially from the central axis of the cone of said shell, said sprockets provided with different numbers of teeth spaced about their periphery to engage with a bicycle chain; an axial fixing element, a radial load transmission profile and a toothed torque transmission profile to transmit to the driver body of the wheel hub; wherein the truncated cone shell, the toothed sprockets, the axial fixing element, the radial load transmission profile and the toothed torque transmission profile are configured in a single piece, wherein the axial fixing element, the radial load transmission profile and the toothed torque transmission profile are radially disposed towards the inside of the truncated cone shell near its small base.

The radial load and torque transmission members are therefore exclusively arranged in the truncated cone shell in order to stably support the sprocket assembly when being mounted on the driver body of the wheel hub, thus decreasing the weight of the assembly. The one-piece construction can be achieved by multiple manufacturing processes including for example, casting, forging, or machining.

DETAILED DESCRIPTION OF THE PREFERRED EMBODIMENT

In a preferred embodiment of the invention, a sprocket assembly (1) is proposed to be mounted on a driver body (4) of a bicycle wheel hub, comprising: a truncated cone shell (2) having a first opening (21) in its small base and a second opening (22) at its large base, wherein both openings are coaxial with a central axis (10) of said truncated cone shell (2). In addition, said truncated cone shell (2) is also provided with a plurality of toothed sprockets (20) disposed in said truncated cone shell (2), having different numbers of teeth extending radially outwardly of the central axis (10) to engage with a bicycle chain. The shell also includes different members for fixing and for load transmission, including: an axial fixing member (23) to fix the truncated cone shell (2) to the driver body (4) of the bicycle wheel hub; a radial load transmission profile (24) perimetrally supported onto the driver body (4); and a toothed torque transmission profile (25) providing tangential engagement in order to transmit torque from the truncated cone shell (2) towards the driver body (4) which is provided with a corresponding engaging profile (45) meshing with said toothed torque transmission profile (25).

It is an object of the present invention the truncated cone shell (2), the toothed sprockets (20), the axial fixing member (23), the radial load transmission profile (24) and the toothed torque transmission profile (25) being configured in a single piece, and wherein the axial fixing member (23), the radial load transmission profile (24) and the toothed torque transmission profile (25) are all disposed towards the inside of the truncated cone shell (2) and close to its small base.

It is another object of the present invention a sprocket assembly (1) wherein the axial fixing member (23) restricts the truncated cone shell (2) position relative to the driver body (4) along the central axis (10) in the direction from the small base towards the large base of the truncated cone shell (2), and wherein the axial fixing member (23) is located just at the small base, therefore being the first one along the central axis (10) in the abovementioned direction, and being the radial load transmission profile (24) and the toothed torque transmission profile (25) axially adjacent to the axial fixing member (23).

In a preferred embodiment of the invention, the axial fixing member (23) is located firstly, relative to the central axis (10) in the direction from the small base towards the large base of the truncated cone shell (2), being the closest to the small base of the truncated cone shell (2), next and axially adjacent to it, is located the radial load transmission profile (24), and finally and axially adjacent to the latest there is the toothed torque transmission profile (25). Said toothed torque transmission profile (25) provides tangential fixing for transmitting torque to the driver body (4), by engaging to a corresponding engaging profile (45) disposed on the outer surface of the driver body (4).

Figure 1:
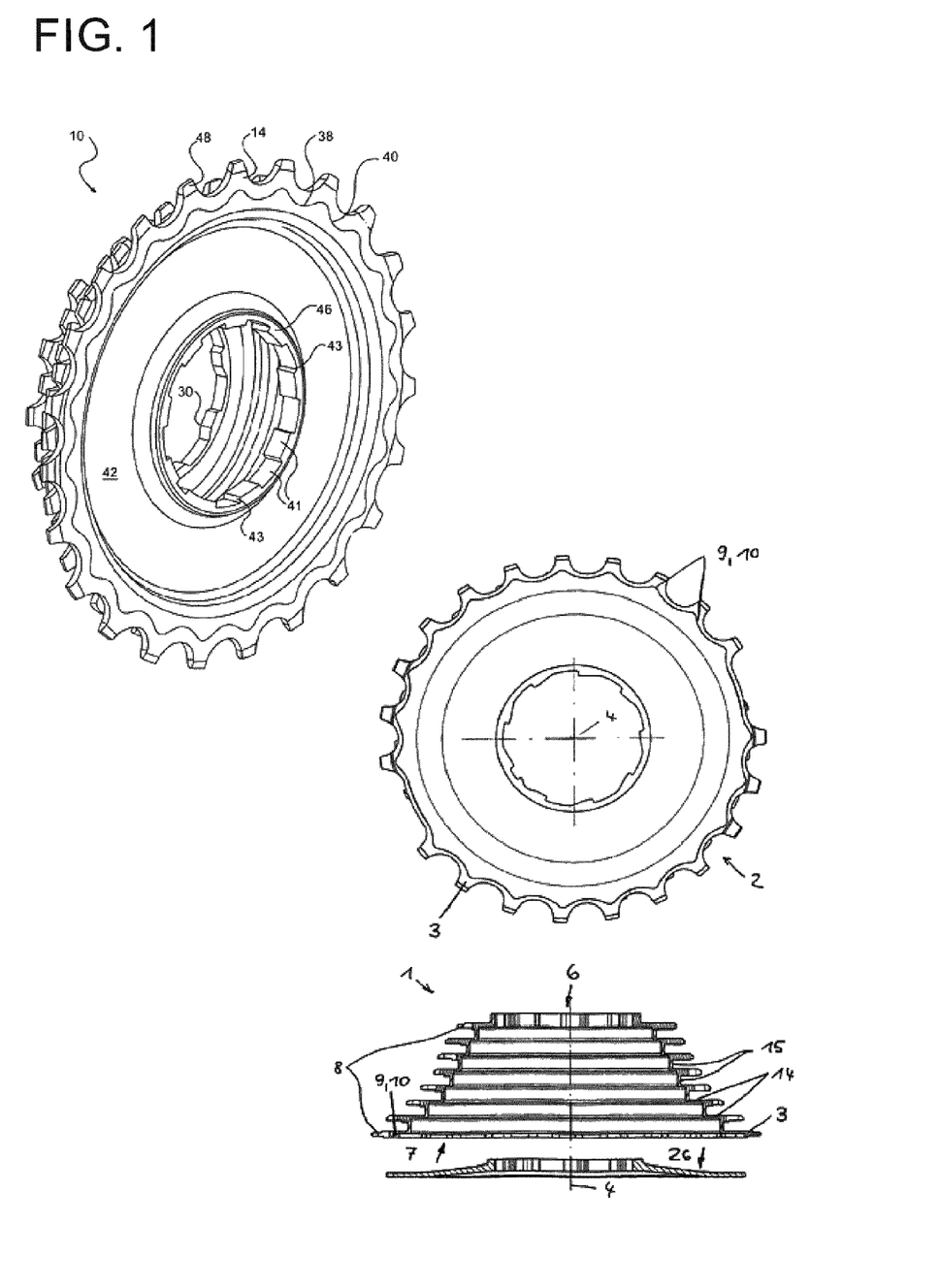
FIG. 1 shows two views of a technical solution from the closer prior art disclosing a sprocket assembly to be mounted on a driver body (4) of a bicycle wheel hub, wherein the transmission of torque towards the hub is made by means of two different members: the truncated cone shell and the cover member.
Figure 2:
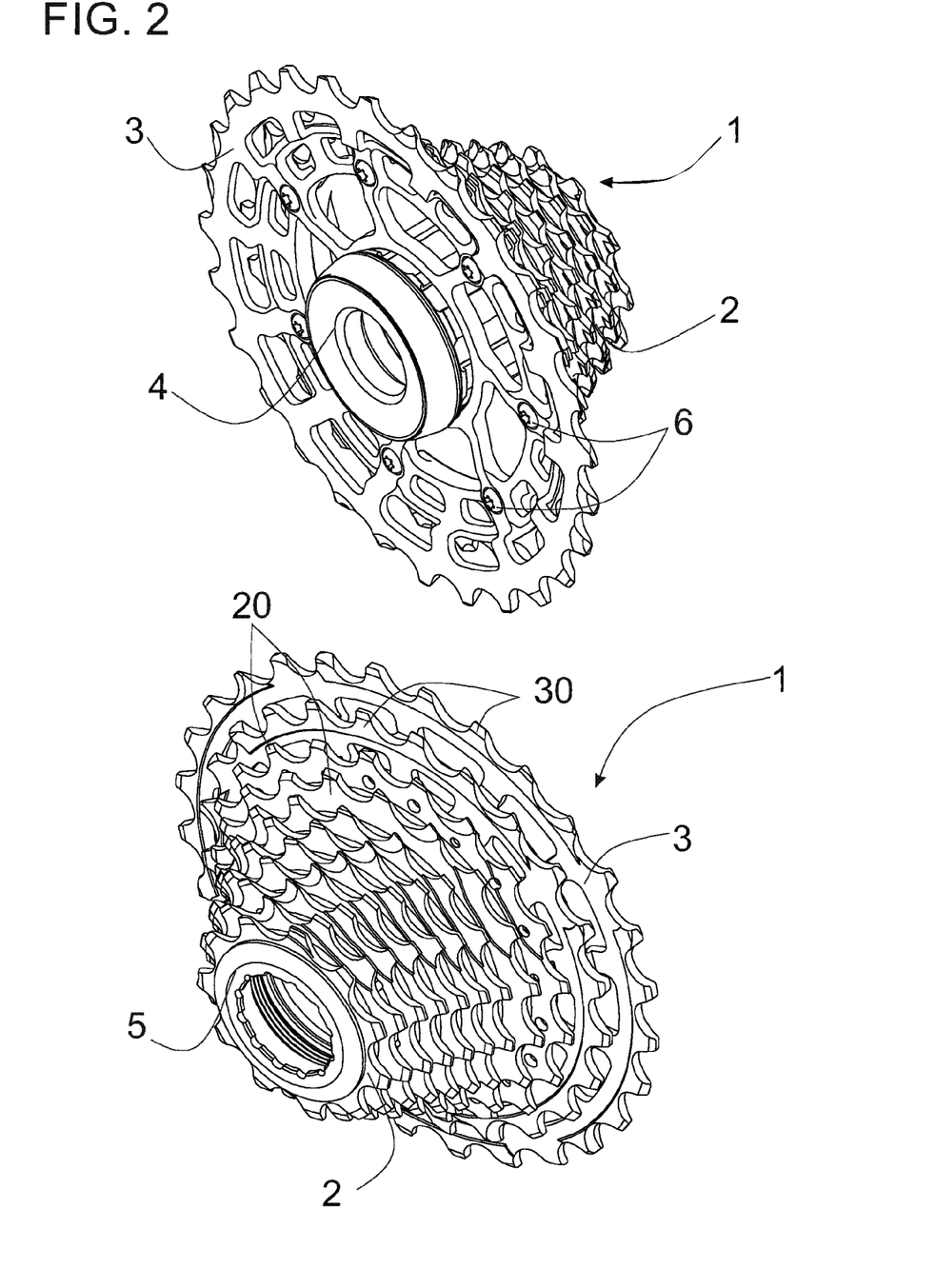
FIG. 2 shows a perspective view of a preferred embodiment of a sprocket assembly (1) to be mounted on a driver body (4) of a bicycle wheel hub, disclosing its main elements: a truncated cone shell (2) with a plurality of toothed sprockets (20) arranged therein to engage with a bicycle chain; a fixing member (5), for axially anchoring the truncated cone shell (2) to the wheel hub driver body (4); a closure member (3) coupled to the large base of the truncated cone shell (2), comprising at least one toothed pinion (30) on its periphery provided with teeth for engaging with a bicycle chain; and anchoring members (6) for fixing the closure member (3) to the truncated cone shell (2).
Figure 3:
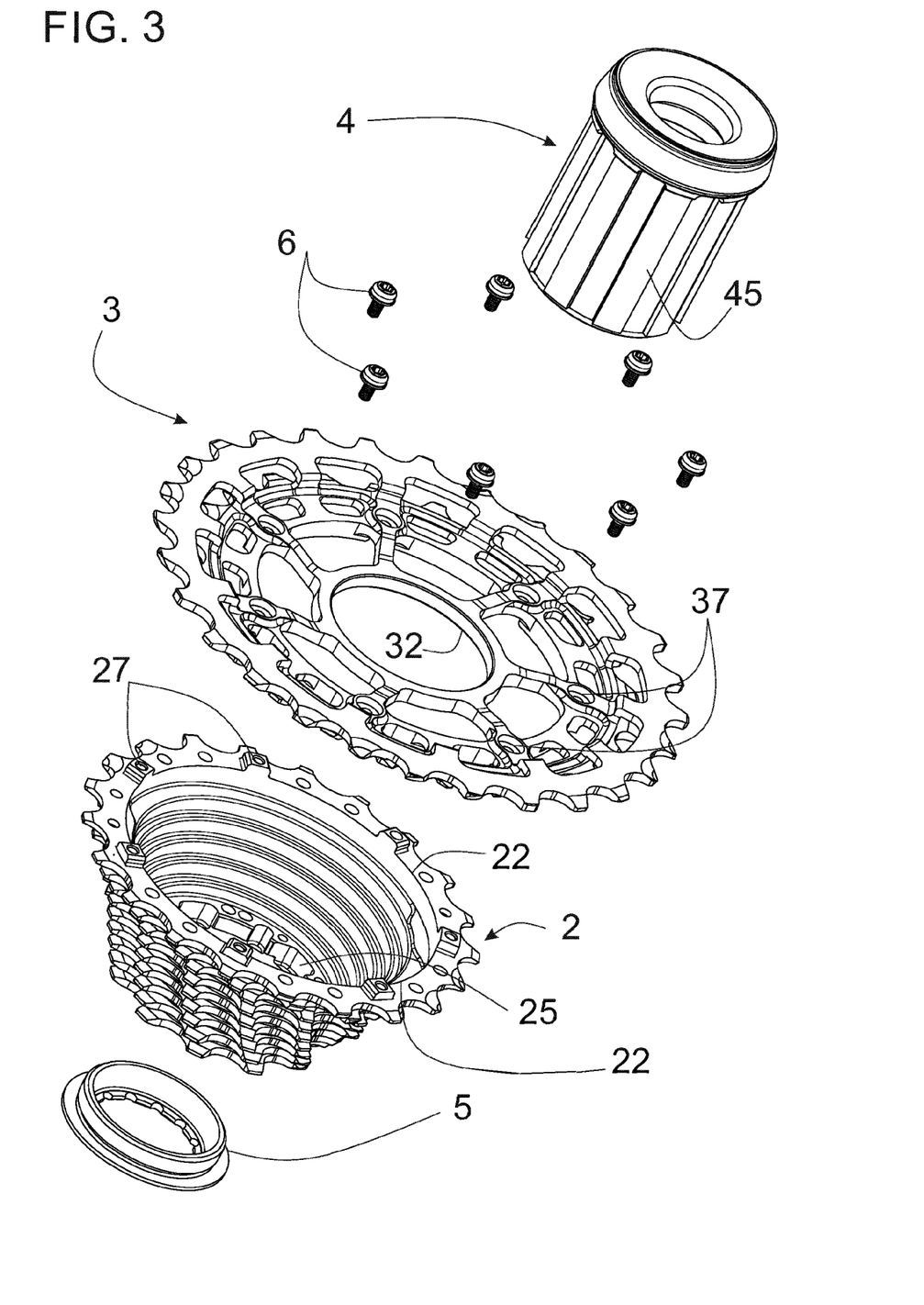
FIG. 3 shows an exploded perspective view of the sprocket assembly (1) for mounting on the driver body (4) of FIG. 2, disclosing the anchoring members (6) which fixe to respective anchoring means arranged in the two fitted members: the anchoring means of the closure (37) and the anchoring means of the shell (27). Furthermore, it is show an engaging profile (45) of the driver body (4) arranged as slots extending along its rotational axis, which mates with the corresponding toothed torque transmission profile (25), configured in the truncated cone shell (2).
Figure 4:
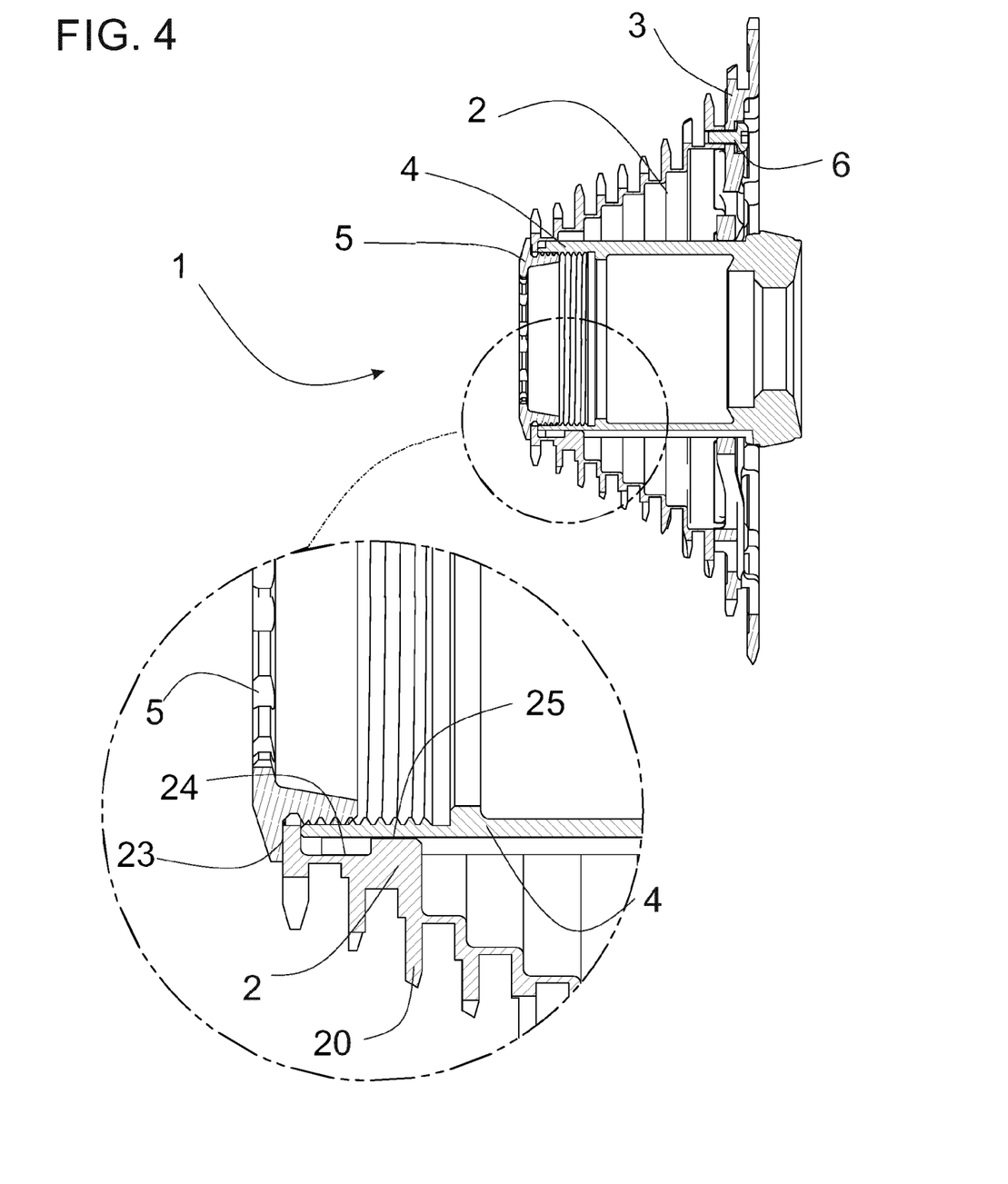
FIG. 4 shows a sectional view and a detail of the sprocket assembly (1), disclosing the axial anchorage between the small base of the truncated cone shell (2) and the driver body (4) by means of a fixing member (5) threaded to said driver body (4), in order to attach the driver body (4) to the truncated cone shell (2).
Figure 5:
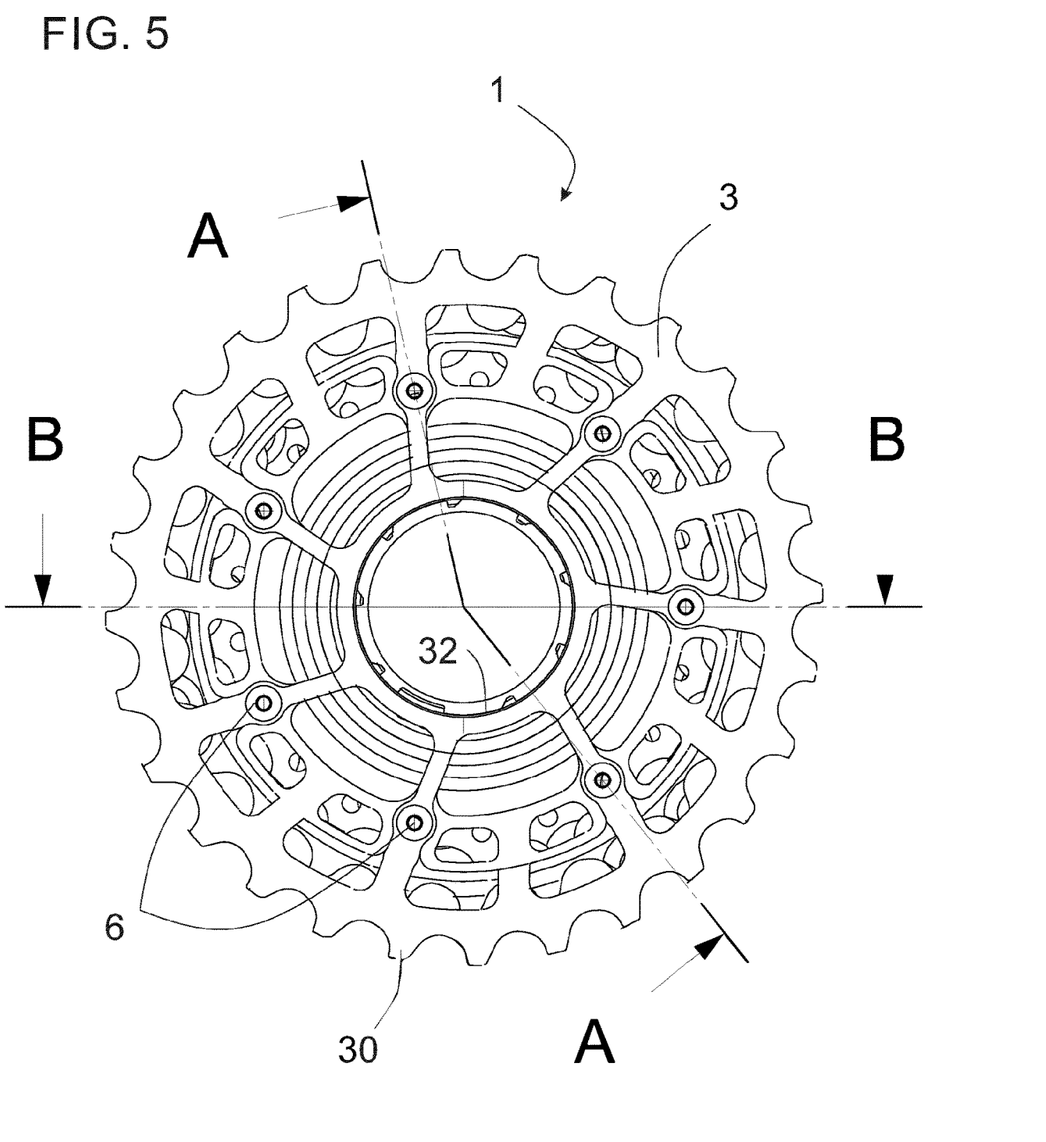
FIG. 5 shows a front view of the sprocket assembly (1), disclosing the closure member (3) with toothed pinions (30) and the anchoring members (6).
Figure 6:
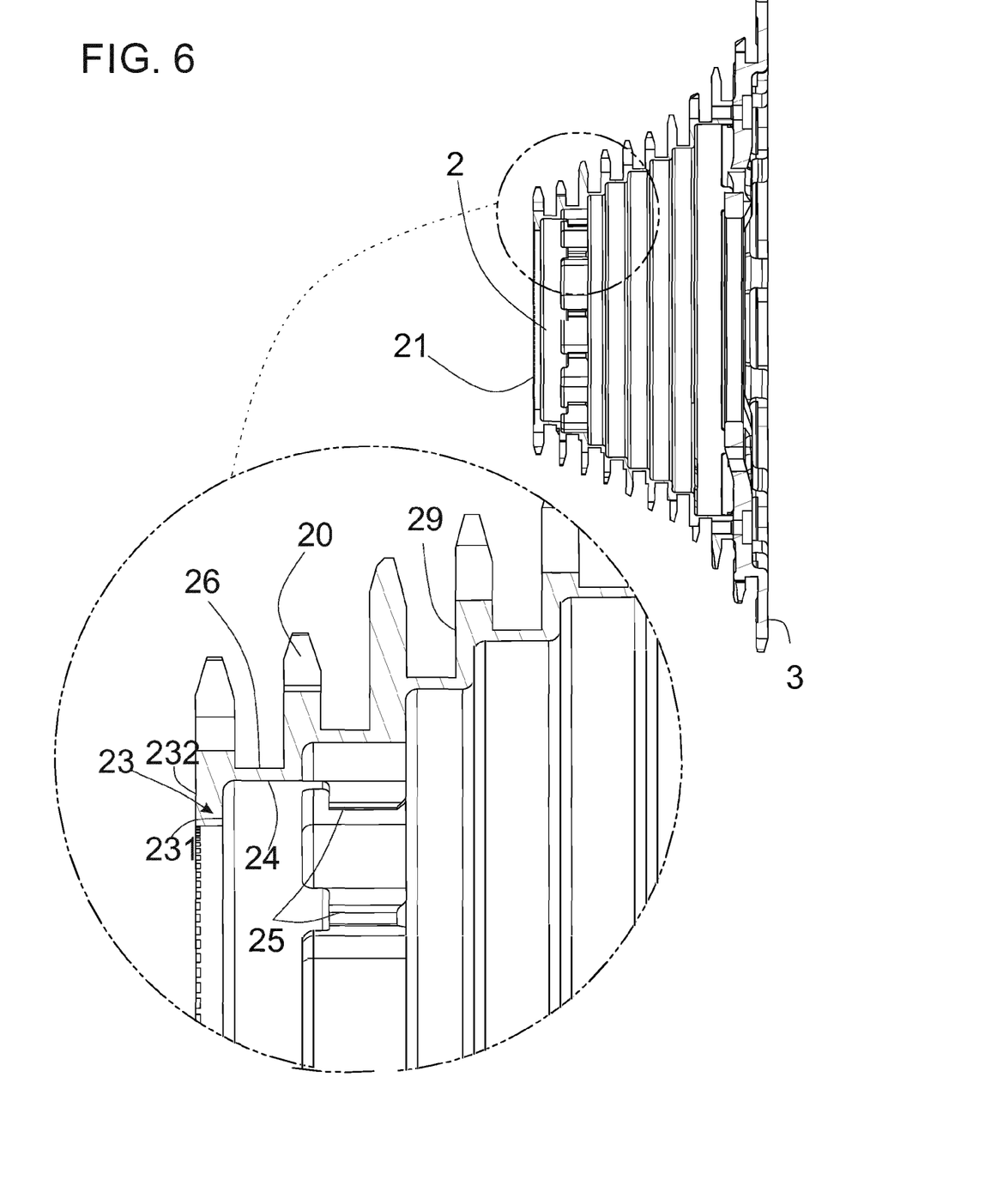
FIG. 6 shows a the A-A section and a detail of FIG. 5 disclosing the axial fixing member (23) comprising an inner wall (231) and an outer wall (232); and the radial load transmission profile (24) and the toothed torque transmission profile (25) which transmit to the driver body (4), both profiles integrally arranged in a single piece in the small base of the truncated cone shell (2).

The axial fixing member (23) is configured as a protrusion, extending radially from the truncated cone shell (2) towards the central axis (10), comprising an inner wall (231), which restricts the axial displacement of the truncated cone shell (2) in the direction of the central axis (10) towards its large base when coming into contact with the driver body (4), and also comprising an outer wall (232), which restricts the axial displacement of the truncated cone shell (2) towards its small base when coming into contact with a fixing member (5), being this fixing member (5) arranged to anchor the truncated cone shell (2) axially to the driver body (4).

The radial load transmission profile (24) is configured as a cylindrical cavity that houses and provides radial support to the driver body (4).

In another preferred embodiment of the invention, the sprocket assembly (1) to be mounted on a driver body (4) of a bicycle wheel hub comprises a closure member (3) extending radially outwardly from the central axis (10) and being coupled to the large base of the truncated cone shell (2). Said closure member (3) includes a third opening (32) coaxial with the central axis (10) of the truncated cone shell for receiving the driver body (4). Furthermore, said closure member (3) comprises at least one toothed pinion (30) at its outer periphery, wherein this toothed pinion (30) is provided with teeth extending radially outwardly from the central axis (10) to engage with a bicycle chain.

In order to transmit to the bicycle chain, the closure member (3) is provided at its outer periphery with at least one toothed pinion (30) having a greater number of teeth and a greater diameter than the adjacent largest toothed pinion (20) of the truncated cone shell (2).

The closure member (3) may include weight reduction openings.

In an alternative embodiment, the closure member (3), the truncated cone shell (2), the toothed sprockets (20) and the load transmission profiles may form a single piece.

In another preferred embodiment of the invention, the sprocket assembly (1) comprises discrete anchoring members (6) for fixing the closure member (3) to the truncated cone shell (2), wherein this anchoring members (6) engage with respective anchoring means: the anchoring means of the closure (37) and the anchoring means of the shell (27). Said anchoring members (6) position axially the closure member (3) relative to the truncated cone shell (2), thereby providing axial fixation for said closure member (3) and contributing to the radial fixation of the truncated cone shell (2) with respect to the driver body (4), due to the closure member (3) is supported in the driver body (4) through the third opening (32).

In a preferred embodiment, said anchoring members (6) are configured as threaded bolts passing through corresponding anchoring means of the closure (37). These anchoring means of the closure (37) are configured as through openings in the closure member (3). Said anchoring members (6) are threaded to the corresponding anchoring means of the shell (27) configured as threaded openings in the truncated cone shell (2).

Figure 7:
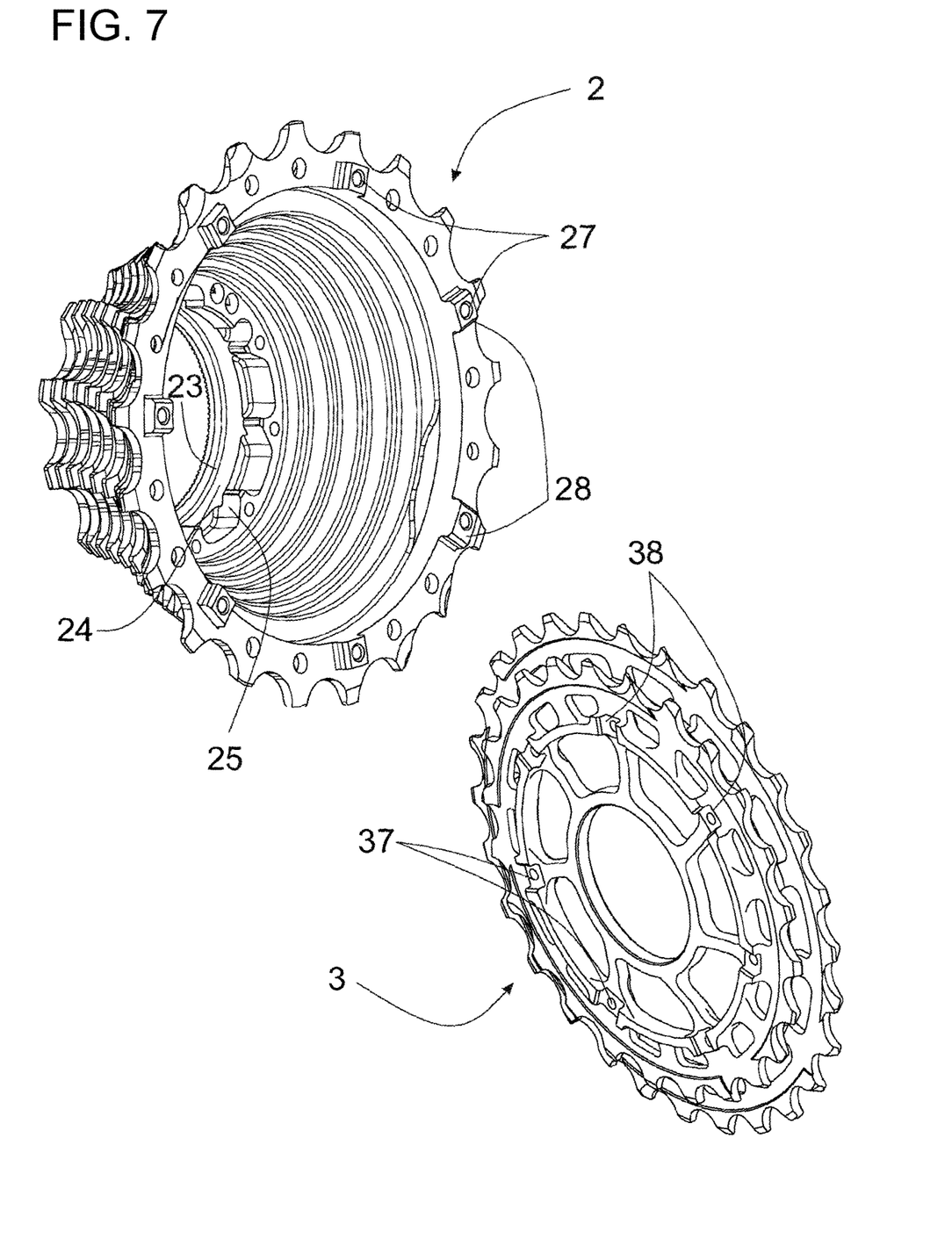
FIG. 7 shows a perspective view of the truncated cone shell (2) provided with a plurality of axial protrusions (28) where the anchoring means of the shell (27) are positioned, and the closure member (3) including a plurality of recesses (38) where the anchoring means of the closure (37) are positioned, wherein said axial protrusions (28) engage with said recesses (38).
Figure 8:
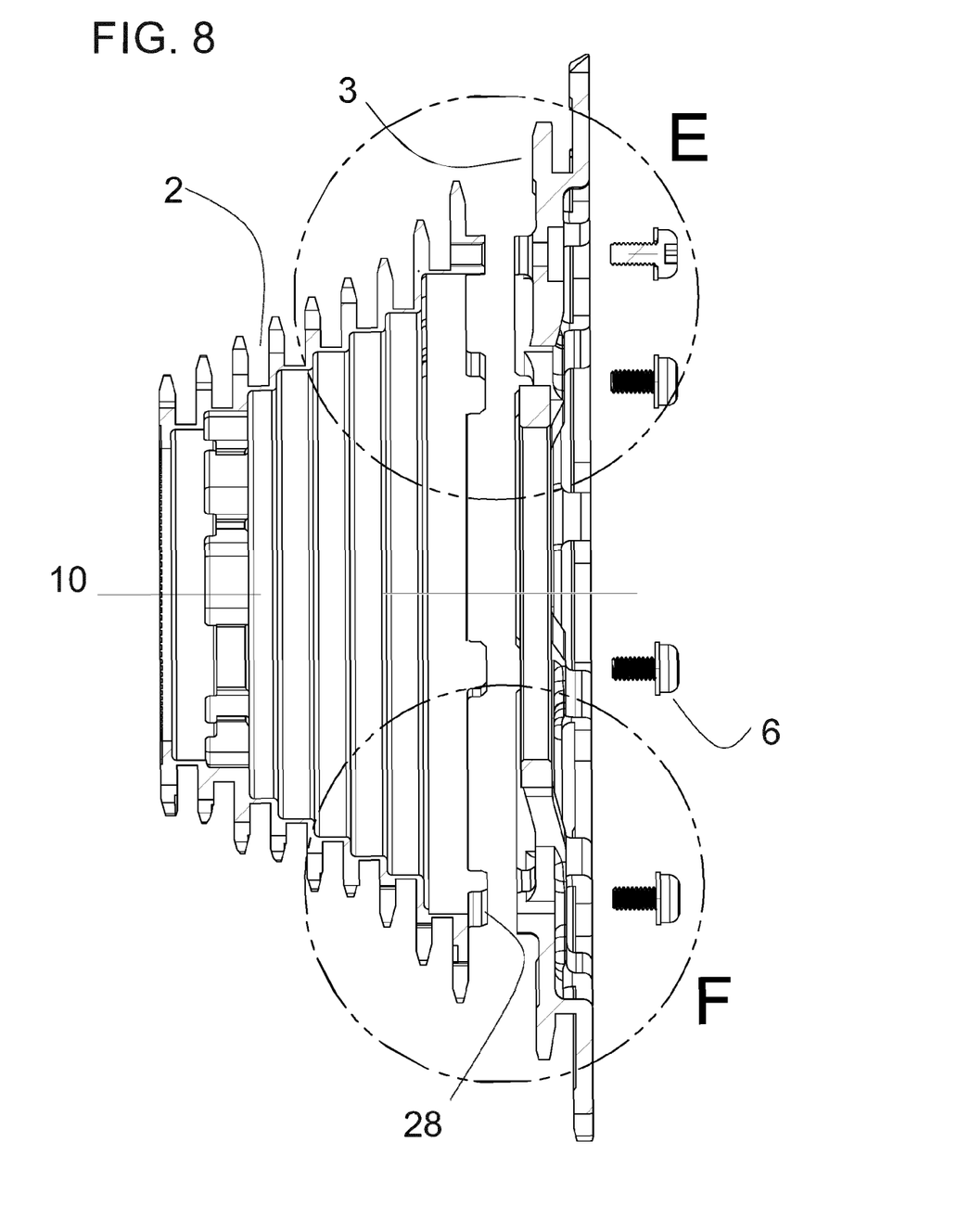
FIG. 8 shows a cross-sectional view of the sprocket assembly (1), disclosing the central axis (10) of the truncated cone shell (2).

A further object of the present invention is a sprocket assembly (1) wherein the large base of the truncated cone shell (2) includes a plurality of discrete axial protrusions (28) wherein the anchoring means of the shell (27) are placed. Moreover, the closure member (3) includes a plurality of corresponding recesses (38) wherein the anchoring means of the closure (37) are positioned. Said axial protrusions (28) mate with said recesses (38) so that the coupling between axial protrusions (28) and recesses (38) contribute to the transmission of tangential load from the closure member (3) towards the truncated cone shell (2).

In another feasible embodiment, the axial protrusions (28) are provided with two opposing faces arranged to support tangential loads in both directions. Likewise, the corresponding recesses (38), mating these axial protrusions, are provided with two opposing faces arranged to transmit tangential load in both tangential directions.

Figure 9:
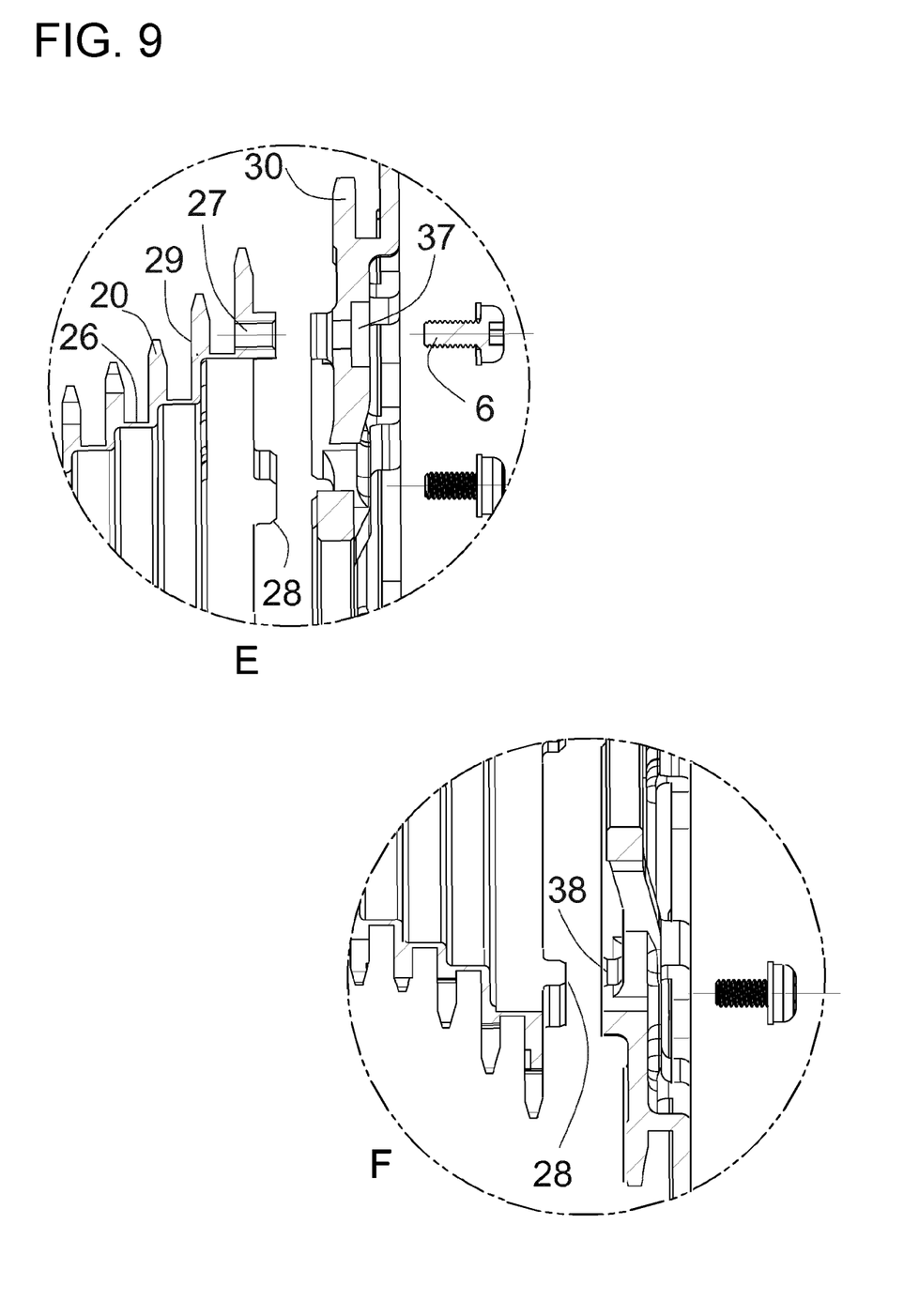
FIG. 9 shows two different details E and F of FIG. 8 disclosing the truncated cone shell (2) configured as a plurality of alternating annular coaxial cylinders (26) and annular coaxial discs (29) step-shaped along the central axis (10) of the truncated cone shell (2).

In other feasible embodiment, the truncated cone shell (2) comprises: a plurality of alternating annular coaxial cylinders (26) and annular coaxial discs (29) step-shaped along the central axis (10) of the truncated cone shell (2), wherein the annular coaxial cylinders (26), the annular coaxial discs (29), the toothed sprockets (20) and the load transmission profiles, namely the axial fixing member (23), the radial load transmission profile (24) and the toothed torque transmission profile (25) are formed in a single piece.

However, said truncated cone shell (2) can be performed in any linear or non-linear shape while the toothed sprockets (20) will stay adequately positioned.

Other Embodiments

In an alternative embodiment of the present invention, the truncated cone shell (2), the toothed sprockets (20), the axial fixing member (23), the radial load transmission profile (24) and the toothed torque transmission profile (25) are configured in a single piece, wherein the axial fixing member (23), the radial load transmission profile (24) and the toothed torque transmission profile (25) are disposed within the truncated cone shell (2) and proximate to its small base. In this new embodiment, the radial load transmission profile (24) and the toothed torque transmission profile (25) are configured together, arranging a single profile configured in the truncated cone shell (2) which performs two functions: on one hand, providing housing and radial support to the driver body (4), and on the other hand, providing tangential fixing in order to transmit torque to the driver body (4).

One desirable objective is to have the greatest number of sprockets or gears at a fixed axial distance, which is the free space for the cassette in the wheel. Having a predetermined chain width and after establishing a number of sprockets of the sprocket assembly (1), the distance between consecutive sprockets is determined.

When the jump in the number of teeth between consecutive sprockets is less than 3, the teeth of the smaller sprocket than the engaged one, are approximately in the same perimeter as the chain. Then, the axial stuck of the chain between the two adjacent sprockets to the engaged one, must be avoid. Thus being the tooth thickness of the engaged and of the adjacent smaller sprockets restricted by the following equation:

$$\text{Tooth thickness} = \text{Distance between sprockets (Fixed)} - \text{Free space between sprockets}$$

On the other hand, when the jump in the number of teeth between two consecutive sprockets is greater than or equal to 3, the tooth thickness of the larger sprocket is not affected by the previous equation, because the increase in its diameter allows the teeth of the smaller one to be perimetrally placed within a diameter which does not interfere, without limiting the axial space required by the chain when engaging.

In another alternative embodiment of the present invention, the elements of the sprocket assembly (1) are manufactured with different materials, to optimize the set lightness. In this way, the truncated cone shell (2) is made of a first high strength material, such as steel or titanium alloys; and the closure member (3), which comprises more than one toothed pinion (30) on its periphery, is made of a second lighter but less resistant material, such as aluminum alloys. So, in order to maintain the mechanical properties of the assembly, the tooth thickness of said toothed pinions (30) is greater than the tooth thickness of the toothed sprockets (20) of the truncated cone shell (2).

In this alternative embodiment, the tooth thickness of the sprockets (20) of the truncated cone shell (2) is about 1.6 mm and the tooth thickness of the toothed pinions (30) of the closure member (3) is about 2 mm, being the smaller toothed pinion (30) of the closure member (3) provided with at least 3 more teeth than the larger toothed sprocket (20) of the truncated cone shell (2).

The invention claimed is:

1. A sprocket assembly (1) to be mounted on a driver body (4) of a bicycle wheel hub, comprising:
   a truncated cone shell (2) having a first opening (21) in a small base of the truncated cone shell (2) and a second opening (22) in a large base of the truncated cone shell (2), both openings being coaxial with a central axis (10) of said truncated cone shell (2);
   a plurality of toothed sprockets (20) having different numbers of teeth disposed in the truncated cone shell (2) and extending radially outwardly of the central axis (10) to engage with a bicycle chain;
   an axial fixing member (23) to fix the truncated cone shell (2) to the driver body (4);
   a radial load transmission profile (24) perimetrally supported onto the driver body (4);
   a toothed torque transmission profile (25) providing tangential engagement in order to transmit torque from the truncated cone shell (2) towards the driver body (4), which is provided with a corresponding engaging profile (45) on an outer surface of the driver body (4);
   wherein the truncated cone shell (2), the toothed sprockets (20), the axial fixing member (23), the radial load transmission profile (24) and the toothed torque transmission profile (25) are configured in a single piece;
   wherein the axial fixing member (23) restricts the truncated cone shell (2) position relative to the driver body (4) along the central axis (10) in the direction from the small base of the truncated cone shell towards the large base of the truncated cone shell (2); and
   wherein the axial fixing member (23), the radial load transmission profile (24) and the toothed torque transmission profile (25) are all disposed towards the inside of the truncated cone shell (2) in an axial direction and close to the small base of the truncated cone shell, being the axial fixing member (23) the first one located next to the small base of the truncated cone shell, and being the radial load transmission profile (24) and the toothed torque transmission profile (25) adjacent to the axial fixing member (23);
   wherein the sprocket assembly (1) comprises a closure member (3) extending radially outwardly from the central axis (10) and being coupled to the large base of the truncated cone shell (2), wherein the closure member (3) includes a third opening (32) coaxial with the central axis (10) of the truncated cone shell (2) for receiving the driver body (4), wherein said closure member (3) comprises at least one toothed pinion (30) at an outer periphery of said closure member provided with teeth extending radially outwardly from the central axis (10) to engage with a bicycle chain, and wherein said toothed pinion (30) has greater diameter and greater number of teeth than those of the plurality of the toothed sprockets (20) configured in the truncated cone shell (2); and
   wherein the smaller toothed pinion (30) of the closure member (3) is provided with at least 3 more teeth than the larger toothed sprocket (20) of the truncated cone shell (2), and wherein the truncated cone shell (2) is made of a first material, and the closure member (3) comprising more than one toothed pinions (30) on its periphery, is made of a second lighter material, being the tooth thickness of said toothed pinions (30) greater than the tooth thickness of the toothed sprockets (20) of the truncated cone shell (2).

2. A sprocket assembly (1) to be mounted on a driver body (4) of a bicycle wheel hub according to claim 1, wherein the axial fixing member (23) is configured as a protrusion, extending radially from the truncated cone shell (2) towards the central axis (10) comprising an inner wall (231), which restricts the axial displacement of the truncated cone shell (2) in the direction of the central axis (10) towards the large base of the truncated cone shell (2) when coming into contact with the driver body (4), and also comprising an outer wall (232), which restricts the axial displacement of the truncated cone shell (2) towards the small base of the truncated cone shell (2) upon contact with a fixing member (5), being this fixing element (5) arranged to anchor the truncated cone shell (2) axially to the driver body (4).

3. A sprocket assembly (1) to be mounted on a driver body (4) of a bicycle wheel hub according to claim 1, wherein the sprocket assembly (1) comprises discrete anchoring members (6) for fixing the closure member (3) to the truncated cone shell (2), and wherein the anchoring members (6) are fixed to respective anchoring means, namely an anchoring means of the closure (37) and an anchoring means of the shell (27).

4. A sprocket assembly (1) to be mounted on a driver body (4) of a bicycle wheel hub according to claim 3, wherein the anchoring members (6) are configured as threaded bolts, passing through the anchoring means of the closure (37) which are configured as through openings in the closure member (3), and wherein the anchoring means of the shell (27) are configured as threaded openings in the truncated cone shell (2) to thread the anchoring members (6).

5. A sprocket assembly (1) to be mounted on a driver body (4) of a bicycle wheel hub according to claim 3, wherein the large base of the truncated cone shell (2) includes a plurality of discrete axial protrusions (28) where the anchoring means of the shell (27) are positioned; wherein the closure member (3) includes a plurality of corresponding recesses (38) where the anchoring means of the closure (37) are positioned; and wherein said discrete axial protrusions (28) mate with said recesses (38) so that the engaging between the discrete axial protrusions (28) and recesses (38) contribute to the transmission of tangential load from the closure member (3) towards the truncated cone shell (2).

6. A sprocket assembly (1) to be mounted on a driver body (4) of a bicycle wheel hub according to claim 5, wherein the discrete axial protrusions (28) are provided with two opposing faces arranged to transmit tangential load in both tangential directions.

7. A sprocket assembly (1) to be mounted on a driver body (4) of a bicycle wheel hub according to claim 5, wherein the recesses (38) are provided with two opposing faces arranged to transmit tangential loads in both tangential directions.

8. A sprocket assembly (1) to be mounted on a driver body (4) of a bicycle wheel hub according to claim 1, wherein the truncated cone shell (2) comprises a plurality of alternating annular coaxial cylinders (26) and annular coaxial discs (29) step-shaped and disposed along the central axis (10) of the truncated cone shell (2).

\* \* \* \* \*